(12) United States Patent
Yang et al.

(10) Patent No.: US 7,933,111 B2
(45) Date of Patent: Apr. 26, 2011

(54) METALLIZED PLASTIC FILM AND FILM CAPACITOR

(75) Inventors: Chang Hoon Yang, Cheonan (KR); Dae Jin Park, Cheonan (KR); Yong Won Jun, Yesan-Gun (KR)

(73) Assignee: Nuinteck Co., Ltd, Asan (KR)

( * ) Notice: Subject to any disclaimer, the term of this patent is extended or adjusted under 35 U.S.C. 154(b) by 464 days.

(21) Appl. No.: 12/116,542

(22) Filed: May 7, 2008

(65) Prior Publication Data

US 2008/0278888 A1 Nov. 13, 2008

(30) Foreign Application Priority Data

May 8, 2007 (KR) .............................. 10-2007-44473
Oct. 23, 2007 (KR) ........................... 10-2007-106471

(51) Int. Cl.
*H01G 4/015* (2006.01)
*H01G 4/005* (2006.01)

(52) U.S. Cl. ......................... 361/273; 361/303; 361/311

(58) Field of Classification Search .................. 361/273, 361/303, 311

See application file for complete search history.

(56) References Cited

U.S. PATENT DOCUMENTS

| 4,477,858 | A | * | 10/1984 | Steiner | 361/273 |
| 5,615,078 | A | * | 3/1997 | Hudis et al. | 361/313 |
| 5,757,607 | A | * | 5/1998 | Folli | 361/273 |
| 6,370,008 | B1 | * | 4/2002 | Vetter | 361/273 |

FOREIGN PATENT DOCUMENTS

| JP | 2006-026972 | 2/2006 |
| JP | 2007-010353 | 1/2007 |
| JP | 2007-053223 | 3/2007 |

* cited by examiner

*Primary Examiner* — Eric Thomas
(74) *Attorney, Agent, or Firm* — Schmeiser, Olsen & Watts LLP

(57) ABSTRACT

A metallized plastic film is formed by winding two sheets of film vapor-deposited with an electrode metal as one group and a film capacitor, comprising; three individual splittings of electrode metal by predetermined width and length and then adjoining of splitting parts. Accordingly, self-heating of the film capacitor can be restrained and a capacitance reduction rate caused by the operation of the fuse parts can be reduced.

10 Claims, 9 Drawing Sheets

METALLIZED PLASTIC FILM AND FILM CAPACITOR

BACKGROUND OF THE INVENTION

1. Field of the Invention

The present invention relates to a winding-type or laminated-type metallized plastic film and a film capacitor. More particularly, the present invention relates to a metallized plastic film and a film capacitor, improved in electrical property and safety of a film capacitor by restricting self-heating of the film capacitor and decreasing capacitance reduction rate caused by the operation of a fuse part and also improved in compactness and thermal resistance for use even at a high temperature.

2. Description of the Related Art

In general, electric capacitors, low-voltage power capacitors, electronic capacitors and so on are used in various fields of industry. Such capacitors usually adopt, as a dielectric, a plastic film which is made of polyethylene terephthalate resin, polypropylene resin, polyethylene naphthalate resin, polycarbonate resin or the like. To provide electrodes in those capacitors, a metallized plastic film formed by vapor-depositing a vapor-deposited metal such as zinc, aluminum, and an aluminum alloy on one or both sides of a plastic film under a high vacuum and another metallized plastic film in which margins are facing the opposite directions are wound as one group.

In the above wound element, zinc or a zinc alloy is sprayed to both sides to withdraw the electrodes, and electrode leading wires are connected by spot-welding or soldering and then insulated by an insulating material as housed in an outer case.

However, the above film capacitor causes a large volume and a high cost since a dedicated safety device is built in the outer case to guarantee safety in use and be used even under a high voltage. Also, when an inner voltage occurs, since the safety device is operated, the performance of the capacitor is deteriorated.

In order to overcome the aforementioned problems, a method has been introduced, which suggests use of a safety metallized plastic film or a pattern-metallized plastic film in the capacitor. According to the method, the vapor-deposited metal is split by a splitting part which is formed by applying a release agent such as oil to a surface of the plastic film by a predetermined form, before the vapor-deposition of the metallized plastic film, such that the metal is not vapor-deposited on the part applied with the release agent. Each split electrode is formed with a fuse part having a narrow width and connected to the vapor-deposited metal.

A general conventional metallized plastic film 8 shown in FIG. 1 is formed by vapor-depositing an electrode metal 2 to a plastic film 1. A split electrode of the electrode metal 2 is not provided. Here, since a temperature fuse or a current fuse for improving safety of the capacitor, or a dedicated safety device which interrupts power supply to the film capacitor by gas generated from an accident of the film capacitor is further employed, or since a thicker metallized plastic film which is 3~5 μm thicker than the normal, the total volume and the price of the film capacitor are increased.

In another conventional metallized plastic film 8 as shown in FIG. 2a, the vapor-deposited metal 2 is split by a T-shape splitting part 3. More particularly, the electrode metal is vapor-deposited on the plastic film 1, and a split electrode 5 is formed by the T-shape splitting part 3, thereby forming one fuse part 4 at the vapor-deposited metal 2.

When insulation breakage occurs within an area of the split electrode 5, the fuse part 4 cuts off the film capacitor from the power supply by dispersing the vapor-deposited metal thereof using a current caused by the insulation breakage. Therefore, although capacitance of the film capacitor is reduced as much as the area of the split electrode 5, explosion of the film capacitor can be prevented, thereby enabling continuous performance of the film capacitor.

Additionally, the metallized plastic film 8 further includes a margin part 6 free of the vapor-deposited metal 2, being continuously formed in a length direction thereof, and a sprayed metal contacting part 7 formed at the opposite end with respect to a width direction.

According to the above structured metallized plastic film 8, since the fuse part 4 is in the vicinity of the sprayed metal contacting part 7, heat generated from both the fuse part 4 and the sprayed metal contacting part 7 are focused, thereby increasing the temperature of the film capacitor while deteriorating insulation efficiency at the heat-focused part. As a result, performance of the fuse part 4 may not be stably maintained.

Furthermore, if the width of the metallized plastic film 8 is greater than 40 mm, the area of the split electrode 5 is increased. Accordingly, the width of the fuse part 4 is increased, which may cause malfunction of the fuse part 4. Consequently, the film capacitor cannot operate as desired.

However, when the fuse part 4 is well operated on the other hand, capacitance of the film capacitor is greatly reduced. To this end, still another metallized plastic film 8 having two or three fuse parts 4 as shown in FIG. 2b has been suggested. However, this structure is also ineffective in guaranteeing the stable operation. Also, such great reduction of capacitance of the film capacitor during the operation of the fuse part 4 still occurs due to a large area of the split electrode 5.

In still another conventional metallized plastic film 8 as shown in FIG. 3, the vapor-deposited metal 2 is split into a plurality of diamond shapes. Respective ends of the split electrodes 5 formed by the splitting part 3 are interconnected through the fuse part 4.

According to this structure, however, electricity applied to the film capacitor flows toward the margin part 6 passing through the sprayed metal contacting part 7 of the metallized plastic film 8. Therefore, a plurality of the split electrodes 5 are to be arranged along the width of the metallized plastic film 8, thereby increasing the number of the fuse part 4, and this causes a bottleneck situation at the fuse parts 4, thereby focusing heat to the fuse parts 4. To this end, the structure shown in FIG. 3 is inappropriate for use under a high voltage.

Still another conventional metallized plastic film 8 is shown in FIG. 4a. Referring to FIG. 4a, the split electrodes 5 are formed to occupy only about a half width of the vapor-deposited metal 2 and split by the T-shape splitting parts 3 each comprising four fuse parts 4. Compared to in the conventional metallized plastic film 8 shown in FIG. 2, the capacitance reduction caused by the operation of the fuse parts 4 is relatively smaller in this structure of FIG. 4a. However, since a pitch interval between the respective split electrodes 5 is great, the whole area of the metallized plastic film 8 is increased. As a result, the capacitance of the film capacitor also greatly reduces when the fuse parts 4 operate.

In addition, when the position of the fuse parts 4 is focused to the middle part of the metallized plastic film 8 and two sheets of the metallized plastic film are wound as one group as shown in FIG. 4b, the fuse parts 4 of the metallized plastic film 8 are focusedly arranged in the middle part, thereby causing focus of heat at the fuse part due to a bottleneck situation of the electric current. Accordingly, a withstanding voltage of the film capacitor is deteriorated, thereby restricting use of the film capacitor.

As shown in FIG. 5, still another conventional metallized plastic film 8 includes the split electrodes 5 having a diamond shape and occupying about a half of the vapor-deposited metal 2 with respect to the width direction. In comparison with the conventional structure shown in FIG. 3, this metallized plastic film 8 is capable of restraining the temperature increase by self-heating of the film capacitor by reducing the number of the fuse parts 4 in the width direction. However, a fuse part 4a adjoining the vapor-deposited metal 2 free of the split electrodes 5 cannot normally function as a fuse since having a great width. Therefore, safety of the film capacitor is not guaranteed.

SUMMARY OF THE INVENTION

Therefore, the present invention has been made in view of the above problems, and it is an object of the present invention to provide a metallized plastic film and a film capacitor capable of improving electrical property thereof by preventing deterioration of dielectric strength of a film even at a high temperature, reducing the rate of capacitance reduction by restraining an operation of a fuse part, and improving safety, compactness and heat resistance for use at a high temperature, by being formed by winding two sheets of metallized plastic film as one group and structured in a manner that fuse parts formed between each pair of a split electrode and a non-split electrode, the fuse parts where a flow of electric current in a width direction of the metallized plastic film is the greatest, are arranged in two rows in a length direction to decentralize generation of heat, thereby preventing occurrence of a high-heat at any special part and maintaining a low temperature throughout the film capacitor, and in a manner that the fuse parts of each metallized plastic film are not focusedly arranged in the middle part of the film capacitor but spaced apart from each other so that the heat is not focused to the fuse parts by a bottleneck situation but can be decentralized, thereby preventing an increase of temperature at the fuse parts.

In accordance with the present invention, the above and other objects can be accomplished by the provision of a metallized plastic film on which an electrode metal is vapor-deposited, comprising a split electrode elongated in a width direction more than a length direction of a plastic film and disposed at any one position within a range of ½~⅘ of the width of the plastic film from a margin part formed at one side of the plastic film and not vapor-deposited with the electrode metal toward the other side of the plastic film with respect to the width direction, a fuse part formed on the non-split electrode or a part adjoining the split electrode near the non-split electrode, and another fuse part formed on each side of respective two adjoining split electrodes, such that the split electrodes are patterned in a continuous form along the length of the plastic film and, in a film capacitor formed by winding two sheets of the metallized plastic film, the fuse parts formed between every pair of a split electrode and a non-split electrode, the fuse parts where a flow of electric current is the greatest in a width direction of the metallized plastic film, are arranged separately in two rows in a length direction of the plastic film.

The metallized plastic film may further comprise a first splitting part formed by cutting an electrode metal by predetermined width and interval along a length of the plastic film, a second splitting part formed by cutting the electrode metal by predetermined width and length from the first splitting part toward the margin part formed at one side, a third splitting part formed by cutting the electrode metal by predetermined width from a position between one end of the second splitting part and one end of another adjoining second splitting part toward one end of the margin part, and a second fuse part formed between the second splitting part and the third splitting part by a fuse forming part generated by cutting the electrode metal in a direction from the one end of the second splitting part and one end of the third splitting part respectively toward adjoining third splitting parts and adjoining second splitting parts.

The metallized plastic film may comprise a first splitting part formed by cutting an electrode metal by predetermined width and interval along a length of the plastic film, a fourth splitting part formed by cutting the electrode metal in accordance with a pattern '>' widening from the first splitting part to one side and a pattern '<' widening from the end of the margin part to the other side, and a fifth splitting part formed by cutting the electrode metal in a linear form extended crosswise toward both widened ends of the patterns '<' and '>', thereby having an X-shape pattern and forming a third fuse part at the both widened ends of the patterns '<' and '>'.

Preferably, the metallized plastic film may further comprise a sixth splitting part formed by cutting the electrode metal according to a pattern '−' of a predetermined length from the middle position between the patterns '<' and '>' of the fourth splitting parts toward converged centers of the patterns '<' and '>', thereby becoming patterns in the form of '<' and '>', such that a fourth fuse part is formed in the middle between the fourth splitting part and one end of the electrode metal near the margin part.

The metallized plastic film may comprise a first splitting part formed by cutting an electrode metal by predetermined width and interval along a length of the plastic film, a seventh splitting part formed by cutting the electrode metal according to a pattern '>' widening toward the margin part so that a fifth fuse part is formed in the middle position between the first splitting part and the end of the electrode metal near the margin part, and an eighth splitting part formed by cutting the electrode metal from positions on the end of the electrode metal near the margin part, the positions corresponding to both ends of the first splitting part, each toward both widened ends of the pattern '>' of the seventh splitting part, thereby forming the fifth fuse part of a predetermined width.

The metallized plastic film may comprise a first splitting part formed by cutting an electrode metal by predetermined width and interval along a length of the plastic film, a ninth splitting part formed by cutting the electrode metal according to a pattern '−' from the first splitting part toward the electrode metal near the margin part, a tenth splitting part formed by cutting the electrode metal according to the pattern '−' by a predetermined length from a position between the first splitting part formed with the ninth splitting part and another adjoining first splitting part toward the margin part, an eleventh splitting part formed by cutting the electrode metal according to the pattern '−' from the end of the electrode metal near the margin part toward the tenth splitting part, a twelfth splitting part formed on the electrode metal to widen from one end of the tenth splitting part and one end of the eleventh splitting part each toward both sides by predetermined width and length, and a thirteenth splitting part formed at a predetermined distance from both widened ends of the twelfth splitting part according to patterns 'Λ' and 'V' so that a seventh fuse part is formed, and spaced apart from adjoining ninth splitting parts by a predetermined distance so that an eighth fuse part is formed.

Here, the fuse parts may have an approximately 0.1~0.2 mm width. The vapor-deposited metal deposited on the plastic film may have a resistance of about 0.5~10 $\Omega/cm^2$ at a sprayed metal contacting part formed at the other end opposite to the margin part with respect to the width direction, and have a resistance of about 2~20 $\Omega/cm^2$ at the other part excluding the sprayed metal contacting part.

In addition, vapor-deposition of the electrode metal on the plastic film may be performed by vapor-depositing any one of aluminum and an aluminum alloy, by vapor-depositing any one of aluminum and an aluminum alloy primarily and then vapor-depositing any one of zinc and a zinc alloy secondarily, or by vapor-depositing any one of aluminum and an aluminum alloy primarily and then vapor-depositing any of zinc and a zinc alloy secondarily only on the sprayed metal contacting part.

The fuse part of any one of the split electrodes may be distanced by 1~40 mm from the fuse part of another adjoining split electrode with respect to the width direction.

BRIEF DESCRIPTION OF THE DRAWINGS

The above and other objects, features and other advantages of the present invention will be more clearly understood from the following detailed description taken in conjunction with the accompanying drawings, in which:

FIG. 4b shows a developed state of the film capacitor of FIG. 4a;

DETAILED DESCRIPTION OF THE PREFERRED EMBODIMENTS

Figure 1:
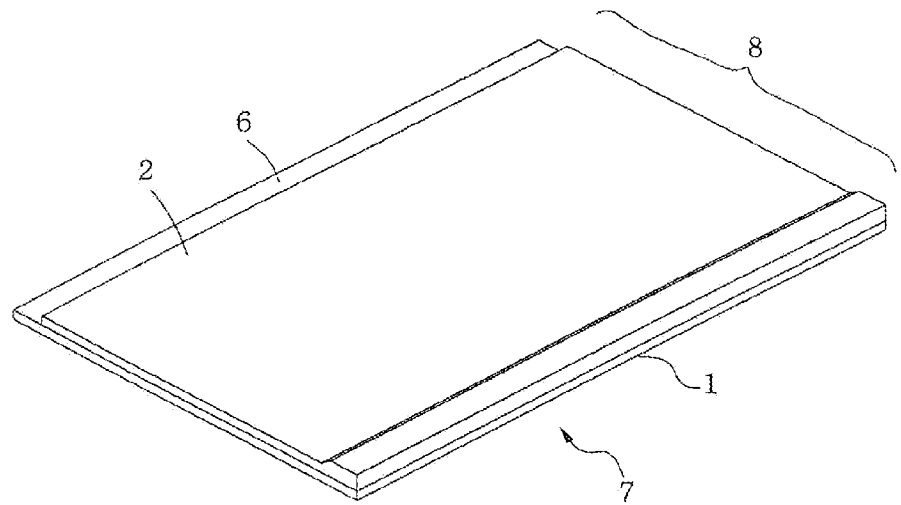
FIG. 1 is a perspective view of a conventional metallized plastic film for a film capacitor.
Figure 2A:
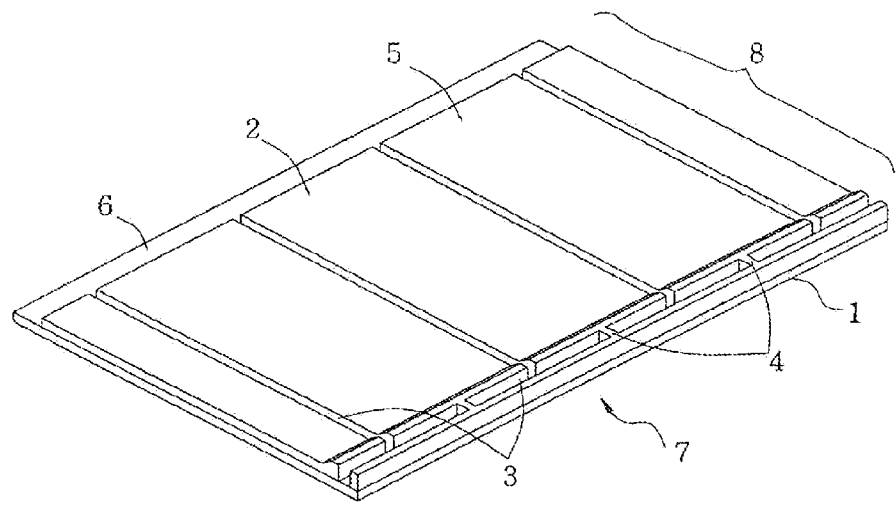
FIG. 2a is a perspective view of another conventional metallized plastic film in which the whole surface of a vapor-deposited metal is split by a T-shape splitting part and each split electrode includes a single fuse.
Figure 2B:
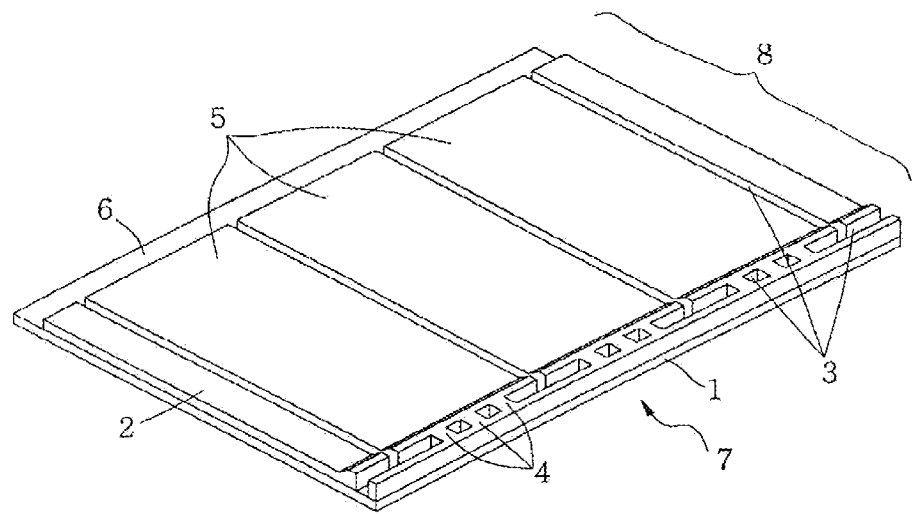
FIG. 2b is a perspective view of still another conventional metallized plastic film in which the whole surface of a vapor-deposited metal is split by a T-shape splitting part and each split electrode includes three fuses.
Figure 3:
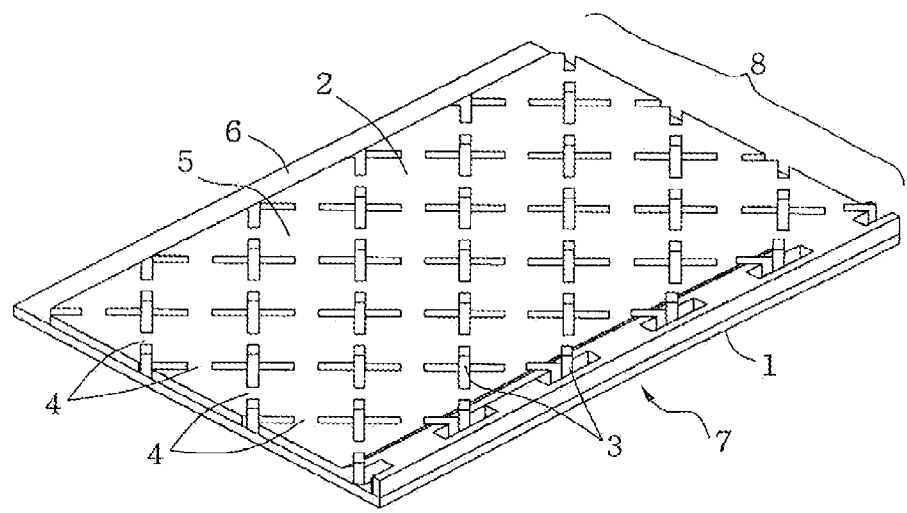
FIG. 3 is a perspective view of still another conventional metallized plastic film in which the whole surface of a vapor-deposited metal is split by a diamond-shape splitting part.

Hereinafter, exemplary embodiments of the present invention will be described in detail with reference to the accompanying drawings.

The object of the present invention is achieved by providing a metallized plastic film. In a film capacitor wherein two sheets of the metallized plastic film vapor-deposited with an electrode metal are wound, fuse parts formed between every pair of a split electrode and a non-split electrode, the fuse parts where a flow of electric current in a width direction of the metallized plastic film is the greatest, are arranged separately in two rows in a length direction of the plastic film. For this purpose, a split electrode elongated more in a width direction than a length direction of the plastic film and disposed at any one position within a range of ½~⅘ of the width of the plastic film from a margin part formed at one side and not vapor-deposited with the electrode metal, toward the other side. A fuse part is formed at any one position of the non-split electrode and a part adjoining the split electrode near the non-split electrode. Also, each side of respective two adjoining split electrodes is formed with another fuse part. The split electrodes are patterned to be in a continuous form along the length of the plastic film.

A metallized plastic film 130 formed by overlapping and winding two sheets, as one group, of film on which an electrode metal is vapor-deposited comprises a first splitting part 105 forming a first fuse part 104 by cutting a vapor-deposited metal 103 by predetermined width and interval along the length of a plastic film 102 on any one position within a range of ½~⅘ of the width of the plastic film 102 from a margin part 101 formed at one side and not vapor-deposited with the electrode metal toward the other side; a second splitting part 106 formed by cutting the vapor-deposited metal 103 by predetermined width and length from the first fuse part 105 toward the margin part 101 formed at the one side; a third splitting part 107 formed by cutting the vapor-deposited metal 103 by predetermined width and length from a position between one end of the second splitting part 106 and one end of another adjoining second splitting part 106 toward one end of the margin part 101; and a second fuse part 109 formed between the second splitting part 106 and the third splitting part 107 by a fuse forming part 108 generated by cutting the vapor-deposited metal 103 in a direction from the one end of the second splitting part 106 and one end of the third splitting part 107 respectively toward adjoining third splitting parts 107 and adjoining second splitting parts 106.

Here, the same effect can be achieved by vapor-depositing the vapor-deposited metal 103 having a small width at any one position of the third splitting part 107.

The above object can also be achieved by providing a metallized plastic film 130 comprising the first splitting part 105 forming a first fuse part 104 by cutting a vapor-deposited metal 103 by predetermined width and interval along the length of a plastic film 102 on any one position within a range of ½~⅘ of the width of the plastic film 102; a fourth splitting part formed by cutting the vapor-deposited metal 103 in accordance with a pattern '>' widening from the first splitting part 105 to one side and a pattern '<' widening from the end of the margin part 101 to the other side; and a fifth splitting part 112 formed by cutting the vapor-deposited metal 103 in a linear form crosswise extended toward both widened ends of the patterns '<' and '>', thereby having an X-shape pattern and forming a third fuse part 111 at the both widened ends of the patterns '<' and '>'.

Here, it is preferable to further comprise a sixth splitting part 114 formed by cutting the vapor-deposited metal 103 according to a pattern '–' of a predetermined length from the middle position between the patterns '<' and '>' toward converged centers of the patterns '<' and '>', thereby becoming patterns in the form of '<' and '>', such that a fourth fuse part 113 is formed in the middle between the fourth splitting part 110 and one end of the vapor-deposited metal 103 near the margin part 101.

The above object of the present invention can also be achieved by providing a metallized plastic film 130 formed by symmetrically overlapping and winding two sheets of film, as one group, on which the electrode metal is vapor-deposited, the metallized plastic film 130 comprising a first splitting part 105 forming a first fuse part 104 by cutting a vapor-deposited metal 103 by predetermined width and interval along the length of a plastic film 102 on any one position within a range of ½~⅘ of the width of the plastic film 102 from a margin part 101 formed at one side and not vapor-deposited with the electrode metal toward the other side; a seventh splitting part 116 formed by cutting the vapor-deposited metal 103 according to a pattern '>' widening toward the margin part 101 so that a fifth fuse part 115 is formed in the middle position between the first splitting part 105 and the end of the vapor-deposited metal 103 near the margin part 101; and an eighth splitting part 118 forming the fifth fuse part 115 of a predetermined width by cutting the vapor-deposited metal 103 from positions on the end of the vapor-deposited metal 103 near the margin part 101, the positions corresponding to both ends of the first splitting part 105, each toward both widened ends of the pattern '>' of the seventh splitting part 116.

Figure 9A:
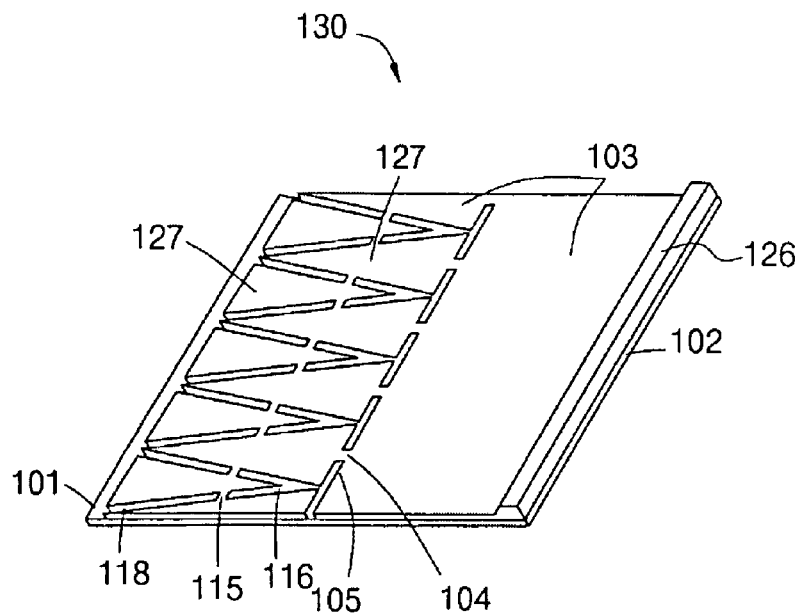
FIG. 9a is a perspective view showing a vapor-deposition pattern of a metallized plastic film according to a fourth embodiment of the present invention.
Figure 9B:
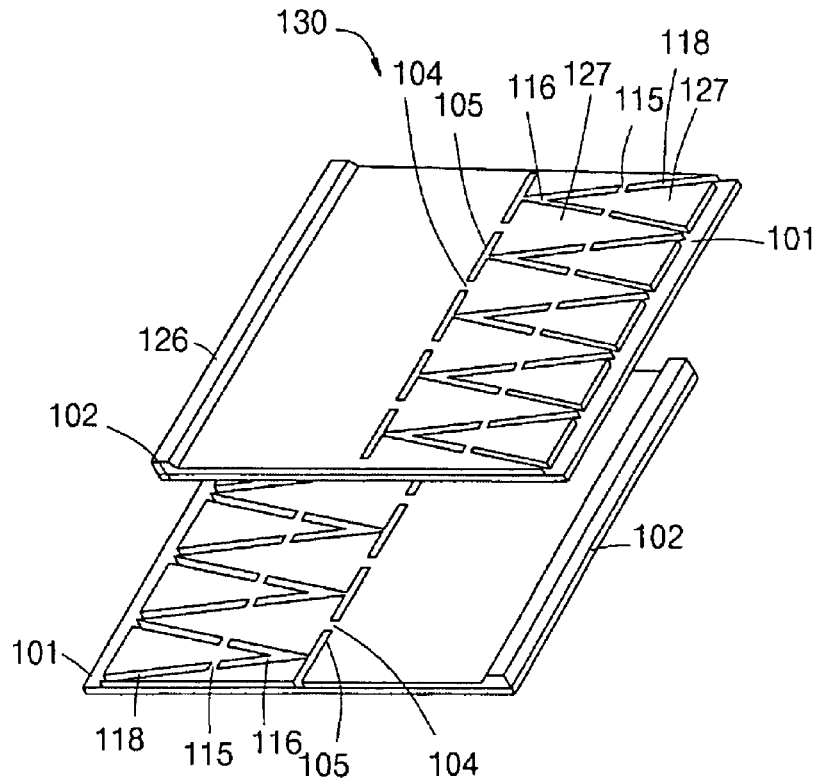
FIG. 9b is a view showing a developed state of a film capacitor applying the metallized plastic film according to the fourth embodiment of the present invention.

As shown in FIG. 9b, the film capacitor may be fabricated by symmetrically overlapping and winding two sheets of the plastic film 102 having the splitting parts and the fuse parts in different patterns from each other.

Additionally, the above object of the present invention can also be achieved by a metallized plastic film 130 which comprises a first splitting part 105 forming a first fuse part 104 by cutting a vapor-deposited metal 103 by predetermined width and interval along the length of a plastic film 102 on any one position within a range of ½~⅘ of the width of the plastic film 102 from a margin part 101 formed at one side and not vapor-deposited with the electrode metal toward the other side; a ninth splitting part 119 formed by cutting the vapor-deposited metal 103 according to a pattern '–' from the first splitting part 105 toward the end of the vapor-deposited metal 103 near the margin part 101; a tenth splitting part 120 formed by cutting the vapor-deposited metal 103 according to the pattern '–' by a predetermined length from a position between the first splitting part 105 formed with the ninth splitting part 119 and another adjoining first splitting part 105 toward the margin part 101; an eleventh splitting part 121 formed by cutting the vapor-deposited metal 103 according to the pattern '–' from the end near the margin part 101 toward the tenth splitting part 120; a twelfth splitting part 122 formed on the vapor-deposited metal 130 to widen from one end of the tenth splitting part 120 and one end of the eleventh splitting part 121 each toward both sides by predetermined width and length; and a thirteenth splitting part 125 formed at a predetermined distance from both widened ends of the twelfth splitting part 122 according to patterns '□' and '□', thereby forming a seventh fuse part 123, and spaced apart from adjoining ninth splitting parts 119 by a predetermined distance, thereby forming an eighth fuse part 124.

Here, the width of the first through the eighth fuse parts is set to 0.1~2.0 mm. Preferably, in addition, the vapor-deposited metal 103 deposited on the plastic film 102 has a resistance of about $0.5~10 \ \Omega/cm^2$ at a sprayed metal contacting part 126 formed at the other end opposite to the margin part 101 with respect to the width direction, and has a resistance of about $2~20 \ \Omega/cm^2$ at the other part thereof excluding the sprayed metal contacting part 126.

In addition, vapor-deposition of the electrode metal on the plastic film 102 may be performed by vapor-depositing aluminum or an aluminum alloy primarily and then vapor-depositing zinc or a zinc alloy on the sprayed metal contacting part 126 secondarily.

Also, another object of the present invention can be achieved by providing a film capacitor employing the metallized plastic film 130 fabricated in accordance with any one of the above described patterns.

Hereinafter, the structure and operation of first through fifth embodiments of the present invention will be explained in detail with reference to FIG. 6a through FIG. 10b.

Figure 6A:
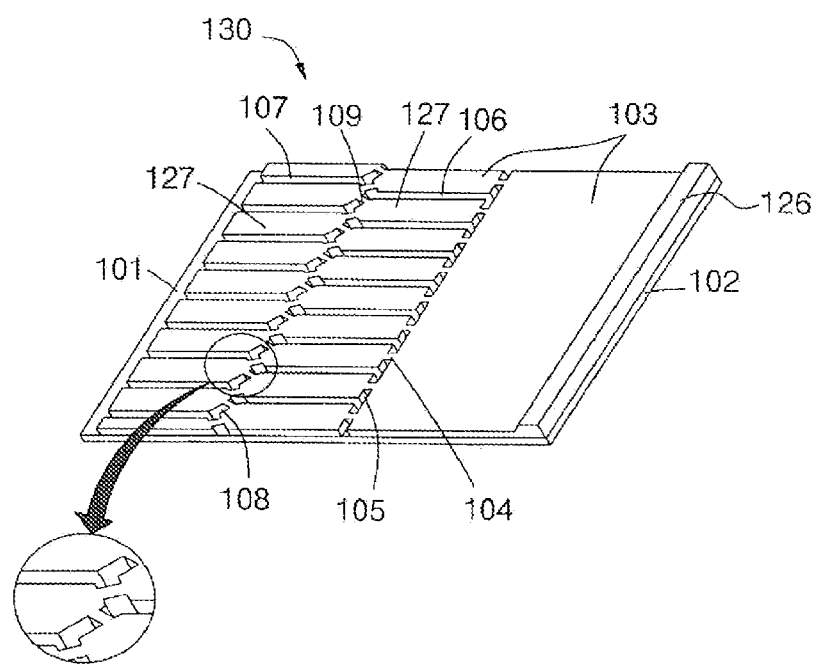
FIG. 6a is a perspective view showing a vapor-deposition pattern of a metallized plastic film according to a first embodiment of the present invention.
Figure 6B:
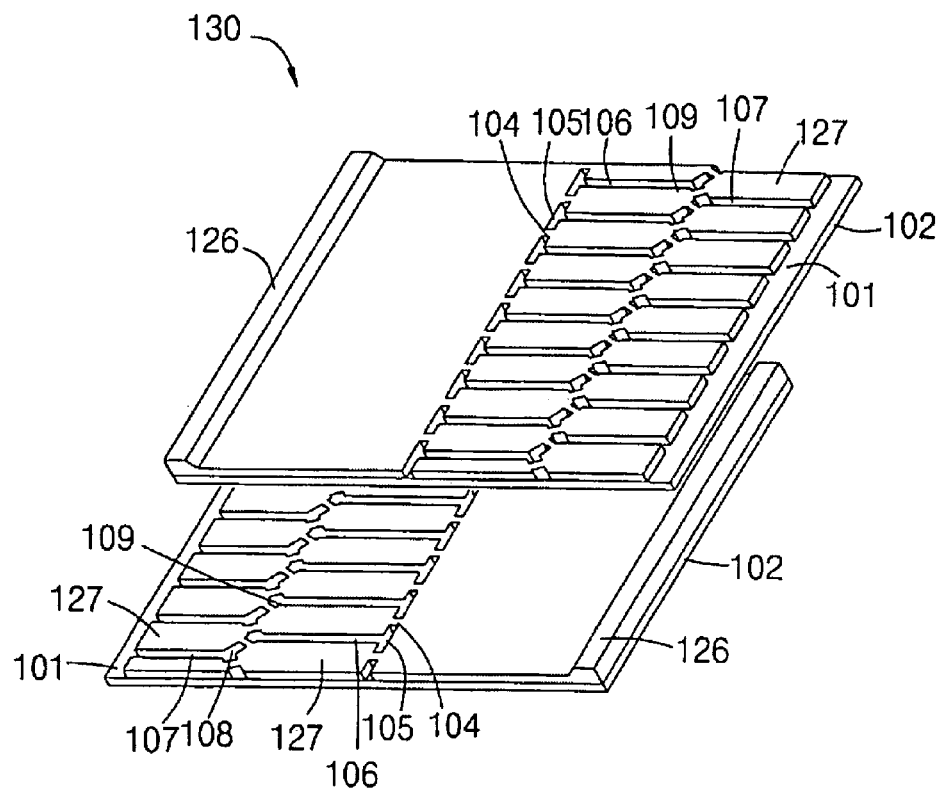
FIG. 6b is a view showing a developed state of a film capacitor applying the metallized plastic film according to the first embodiment of the present invention.

In a metallized plastic film 130 according to a first embodiment of the present invention as shown in FIG. 6a, the electrode metal is vapor-deposited on one or both sides of the dielectric plastic film 102, and the first splitting part 105 is continuously formed by cutting the vapor-deposited metal 103 by predetermined width and length along the length of the plastic film 102 on any one position within a range of ½~⅘ of the width of the plastic film 102 from the margin part 101 formed at one side toward the other side with respect to the width of the plastic film 102. Accordingly, the first fuse part 104 is generated between every two first splitting parts 105.

The second splitting part 106 is formed by cutting the vapor-deposited metal 103 by predetermined width and length from the first splitting part 105 toward the margin part 101, thereby generating a split electrode 127 between two adjoining second splitting parts 106.

Additionally, the third splitting part 107 is formed by cutting the vapor-deposited 103 from a predetermined position between one end of the second splitting part 106 near the margin part 101 and one end of another adjoining second splitting part 106, for example, the middle between the ends of the second splitting parts 106 of both sides as shown in FIG. 6a, toward the one end of the margin part 104. Accordingly, the split electrode 127 is generated also between the third splitting part 107 and adjoining third splitting parts 107.

Here, the fuse forming part 108 is formed by cutting the vapor-deposited metal 103 by predetermined width and length in a direction from one end of the second splitting part 106 and one end of the third splitting part 107 respectively toward the ends of adjoining third splitting parts 107 and the ends of adjoining second splitting parts, thereby generating the second fuse part 109 between the second and the third splitting parts 106 and 107 as shown in FIG. 6a.

Thus, since the numbers of the first fuse part 104 and the second fuse part 109 in the width direction of the plastic film 102 which is a flowing direction of the electric current are each reduced to one, heat generation at the fuse parts can be restricted. In the film capacitor formed by winding two sheets of the metallized plastic film 130 as one group, the first fuse parts 104 where the flow of electric current in the width direction and the heat generation is greatest are arranged in two rows, thereby distributing the generated heat to two parts. Accordingly, occurrence of high heat in the middle of the film capacitor can be restrained and the film capacitor can be maintained at a relatively low temperature uniformly.

Consequently, the film capacitor can be used even under a high temperature state and have an improved lifespan.

Figure 4A:
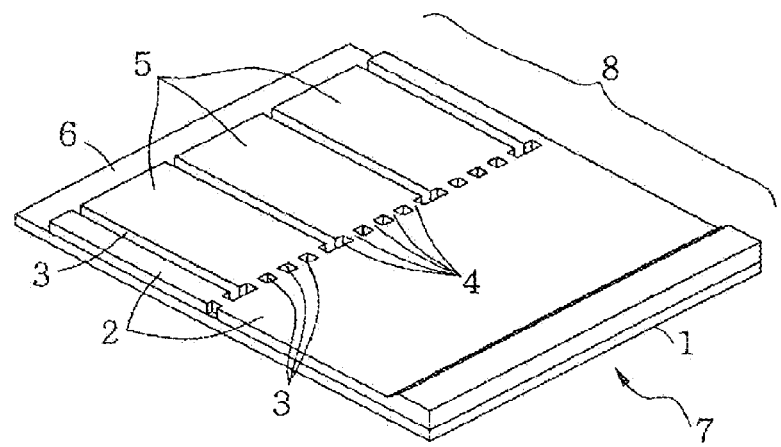
FIG. 4a is a perspective view of still another conventional metallized plastic film in which split electrodes are formed on the vapor-deposited metal to occupy only a half width of the film, as split by a T-shape splitting part, and each split electrode includes four fuses.
Figure 4B:
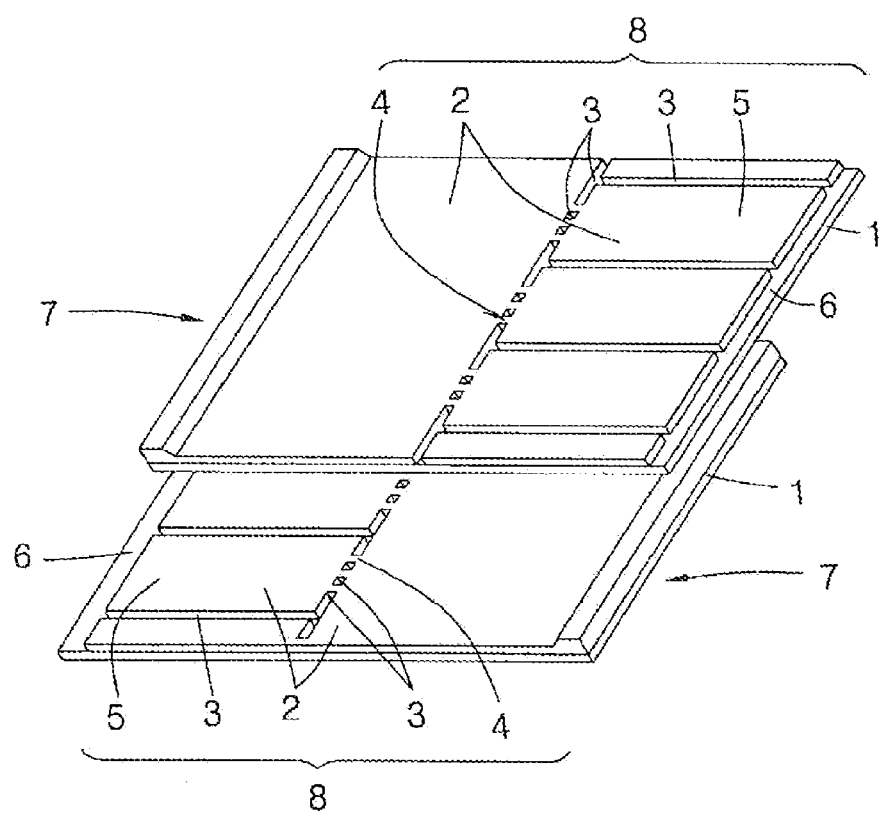
Figure 5:
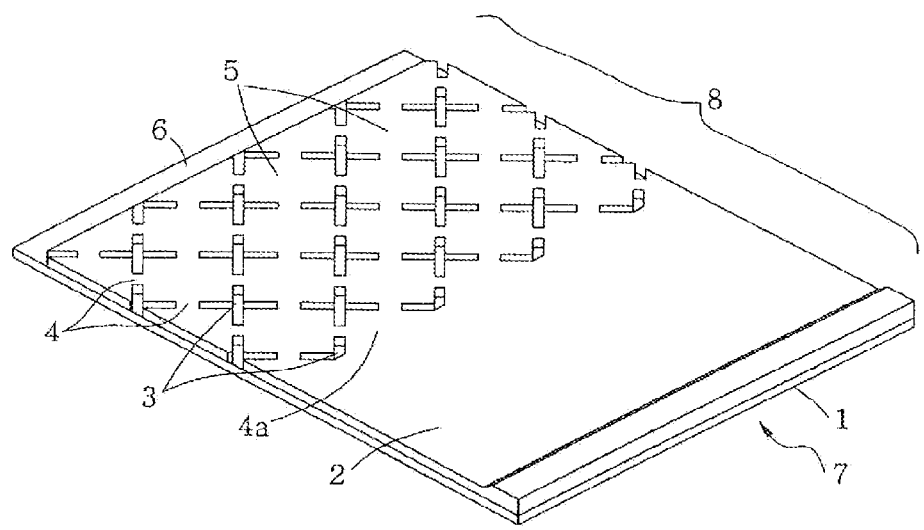
FIG. 5 is a perspective view of still another conventional metallized plastic film in which split electrodes are formed on the vapor-deposited metal to occupy only a half width of the film, as split by a diamond-shape splitting part.

To compare the first embodiment of the present invention with the conventional art shown in FIG. 4a, the electric current flowing through the fuse part 4 of the conventional art of FIG. 4a is greater due to a large area of the split electrode 5. In the conventional film capacitor comprising the two metallized plastic films 8 shown in FIG. 4b, since the fuse parts 4 are focused to the middle of the film capacitor, the generated heat is focused at the middle and accordingly, the dielectric strength is deteriorated due to the high heat and the lifespan of the film capacitor is shortened. Consequently, the film capacitor is inappropriate for use under a high temperature, departing from the object of the invention.

Figure 7A:
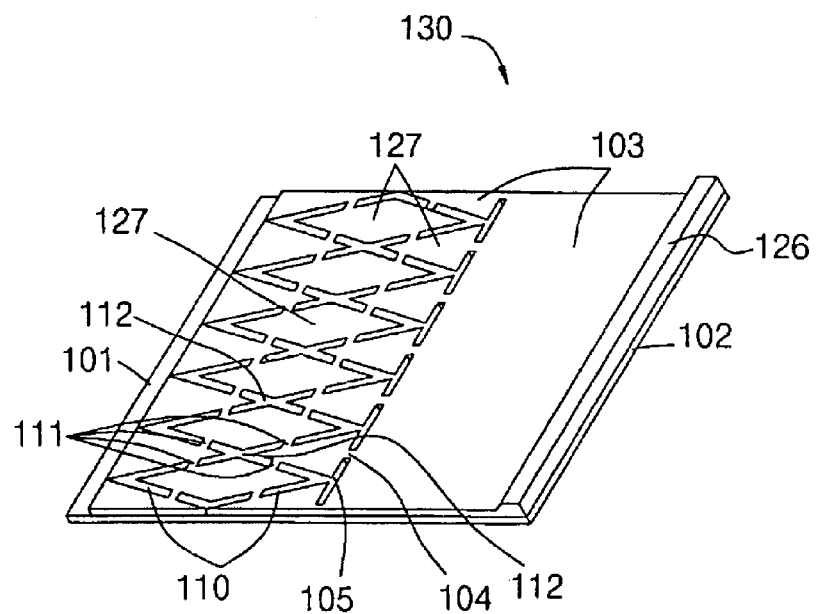
FIG. 7a is a perspective view showing a vapor-deposition pattern of a metallized plastic film according to a second embodiment of the present invention.

According to a second embodiment of the present invention as shown in FIG. 7a, the metallized plastic film 130 is configured by vapor-depositing the electrode metal on one or both sides of the dielectric plastic film 102 and forming the first splitting part 105 by cutting the vapor-deposited metal 103 by predetermined width and length, in the same manner as in the first embodiment, along the length of the plastic film 102 on any one position within a range of ½~⅘ of the width of the plastic film 102 from the margin part 101 formed at one side toward the other side opposite to the margin part 101 with respect to the width of the plastic film 102. Accordingly, the first fuse part 104 is generated.

Next, the vapor-deposited metal 103 adjoining the first splitting part is cut in accordance with a pattern '>' widening from the first splitting part toward the margin part 101, thereby forming the fourth splitting part 110. By cutting the fourth splitting part 110 in accordance with a pattern '<' widening from the end of the margin part 101 toward the other side, the patterns '<' and '>' are arranged at both sides to face each other.

In addition, the fifth splitting part 112 is formed in directions linearly intercrossing both widened ends of the patterns '<' and '>'. More specifically, facing ends of the fourth splitting part 110 and the fifth splitting part 112 are spaced from each other by a predetermined distance, thereby forming the third fuse part 111 having a width as much as the spaced distance.

Here, since being linearly formed between the ends of two facing fourth splitting parts 110, the fifth splitting part 112 has an X-shape pattern as shown in FIG. 7a.

As a result, in the film capacitor according to the second embodiment as shown in FIG. 7a, just one first fuse part 104 and two second fuse parts 109 are provided so that the heat generation at the fuse parts can be reduced.

Figure 7B:
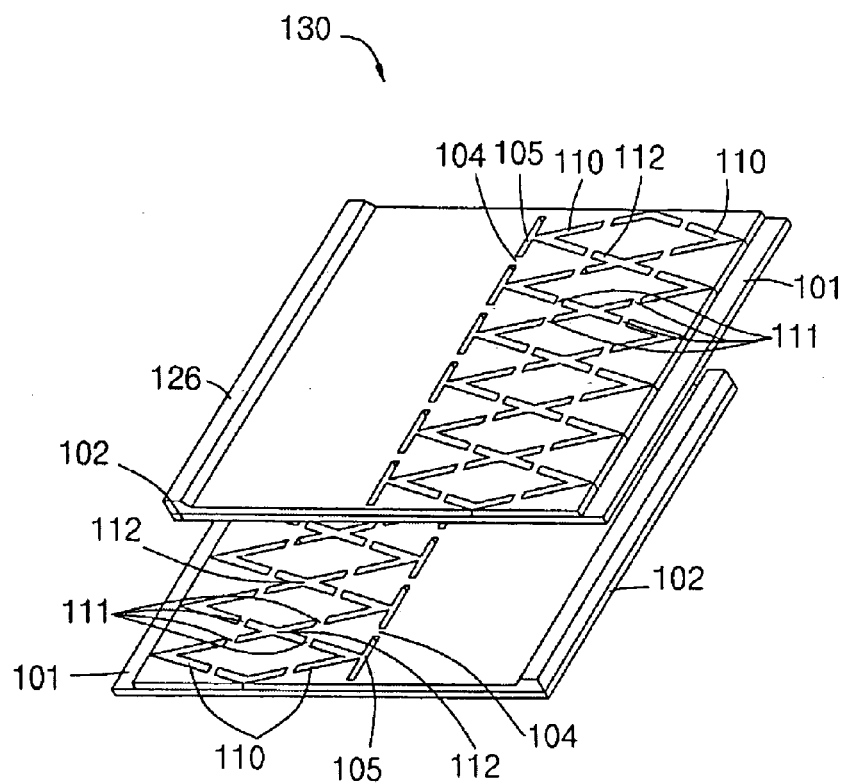
FIG. 7b is a view showing a developed state of a film capacitor applying the metallized plastic film according to the second embodiment of the present invention.

Furthermore, in a film capacitor formed by winding two sheets of the metallized plastic film 130 as one group, when the two sheets of metallized plastic film 130 are overlapped in the opposite directions as shown in FIG. 7b, the first fuse parts 104 where the flow of electric current in the width direction and the heat generation is greatest are arranged in two rows, thereby distributing the generated heat to two parts. Accordingly, occurrence of high heat in the middle of the film capacitor can be restrained and the film capacitor can be maintained at a relatively low temperature uniformly.

Consequently, the film capacitor can be used even under a high temperature state and have an improved lifespan.

Figure 8A:
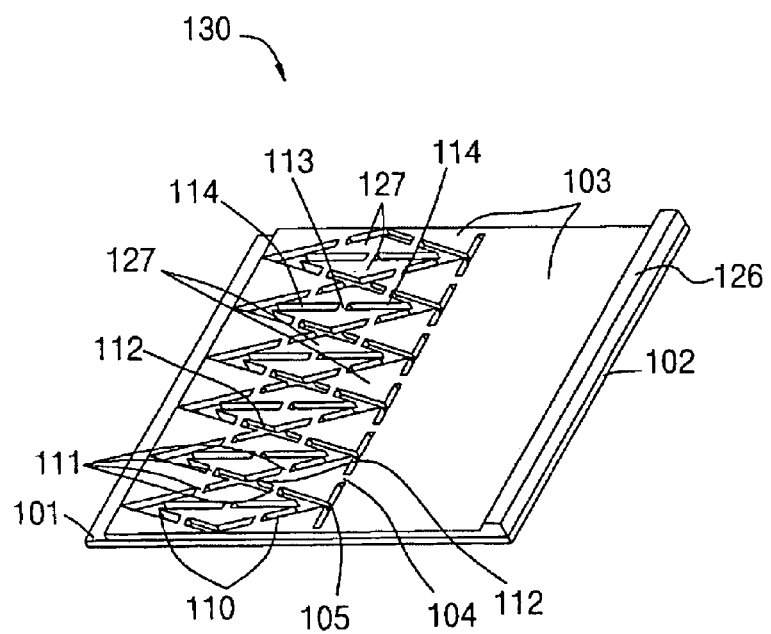
FIG. 8a is a perspective view showing a vapor-deposition pattern of a metallized plastic film according to a third embodiment of the present invention.

Meanwhile, according to a third embodiment of the present invention as shown in FIG. 8a, the sixth splitting part 114 is added to the patterns of the second embodiment. More specifically, the vapor-deposited metal 130 is cut in a pattern '−' from the middle between the patterns '<' and '>' of the fourth splitting part 110 toward the converged centers of the patterns '<' and '>' such that the fourth fuse part 113 is formed in the middle between the first splitting part 105 and the end of the metallized plastic film near the margin part 101. Therefore, the patterns between the fourth and the sixth splitting parts 110 and 114 are in the form of '←' and '→'.

Figure 8B:
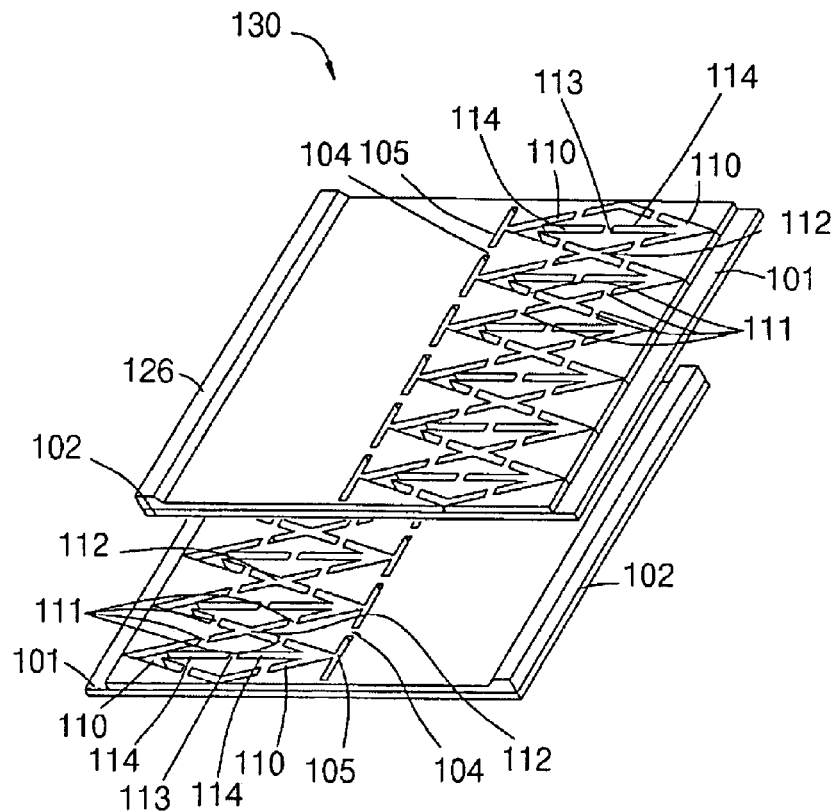
FIG. 8b is a view showing a developed state of a film capacitor applying the metallized plastic film according to the third embodiment of the present invention.

Since the numbers of the first fuse part 104 and the second fuse part 111 are thus reduced to one and two, respectively, as shown in FIG. 8a, heat generation at the fuse parts is reduced. In addition, in the film capacitor formed by winding the two sheets of metallized plastic film 130 as one group, when the two sheets of the metallized plastic film 130 are overlapped in the opposite directions as shown in FIG. 8b, the first fuse parts 104 where the flow of electric current in the width direction and the heat generation is greatest are arranged in two rows, thereby distributing the generated heat to two parts. Accordingly, occurrence of high heat in the middle of the film capacitor can be restrained and the film capacitor can be maintained at a relatively low temperature uniformly.

Consequently, the film capacitor can be used even under a high temperature state and have an improved lifespan.

According to a fourth embodiment of the present invention as shown in FIG. 9a, the electrode metal is vapor-deposited on one or both sides of the dielectric plastic film 102, the first splitting part 105 is continuously formed by cutting the vapor-deposited metal 103 by predetermined width and length along the length of the plastic film 102 on any one position within a range of ½~⅘ of the width of the plastic film 102 from the margin part 101 formed at one side toward the other side opposite to the margin part 101 with respect to the width of the plastic film 102. Accordingly, the first fuse part 104 is generated between two adjoining first splitting parts 105.

The seventh splitting part 116 is formed by cutting the vapor-deposit 103 according to a pattern '>' widening toward the margin part 101 so that a fifth fuse part 115 is formed in the middle position between the first splitting part 105 and the end of the vapor-deposited metal 103 near the margin part 101. Additionally, the eighth splitting part 118 is formed by cutting the vapor-deposited metal 103 according to the pattern '<' from positions on the end of the vapor-deposited metal 103 near the margin part 101, the positions corresponding to both ends of the first splitting part 105 in the width direction, each toward both widened ends of the pattern '>' of the seventh splitting part 116. As a result, the fifth fuse part 115 having a predetermined width is formed between ends of the seventh splitting part 116 and the eighth splitting part 118 as shown in FIG. 9a.

Therefore, the numbers of the first fuse part 104 and the second fuse part 111 in the width direction of the plastic film 102, that is, the flowing direction of the electric current, are thus reduced to one and two, respectively, as shown in FIG. 9a. Accordingly, heat generation at the fuse parts can be reduced. In addition, in the film capacitor formed by winding the two sheets of metallized plastic film 130 as one group, when the two sheets of the metallized plastic film 130 are overlapped in the opposite directions as shown in FIG. 9b, the first fuse parts 104 where the flow of electric current in the width direction and the heat generation is greatest are arranged in two rows so that the generated heat can be distributed to two parts. Accordingly, occurrence of high heat in the middle of the film capacitor can be restrained and the film capacitor can be maintained at a relatively low temperature uniformly.

Consequently, the film capacitor can be used even under a high temperature state and have an improved lifespan.

Figure 10A:
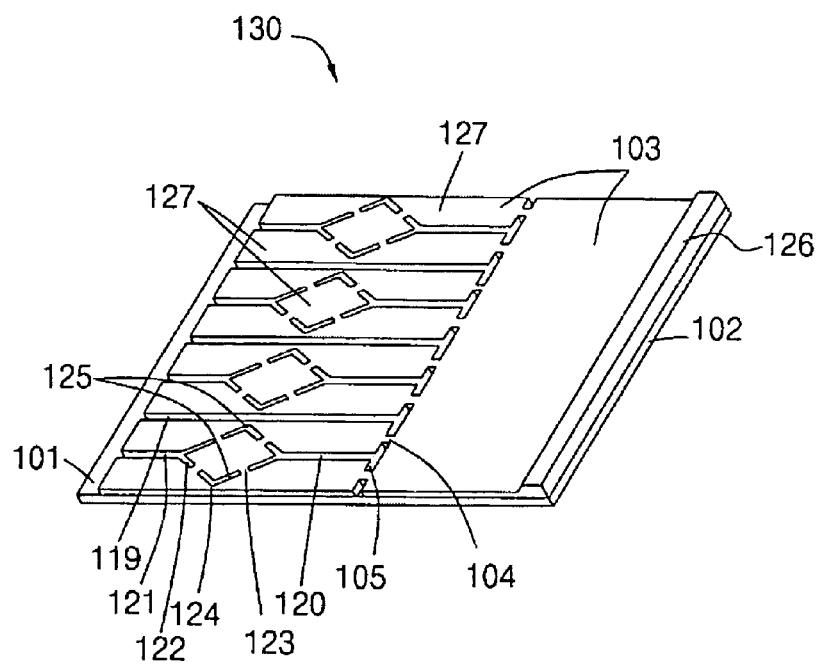
FIG. 10a is a perspective view showing a vapor-deposition pattern of a metallized plastic film according to a fifth embodiment of the present invention.
Figure 10B:
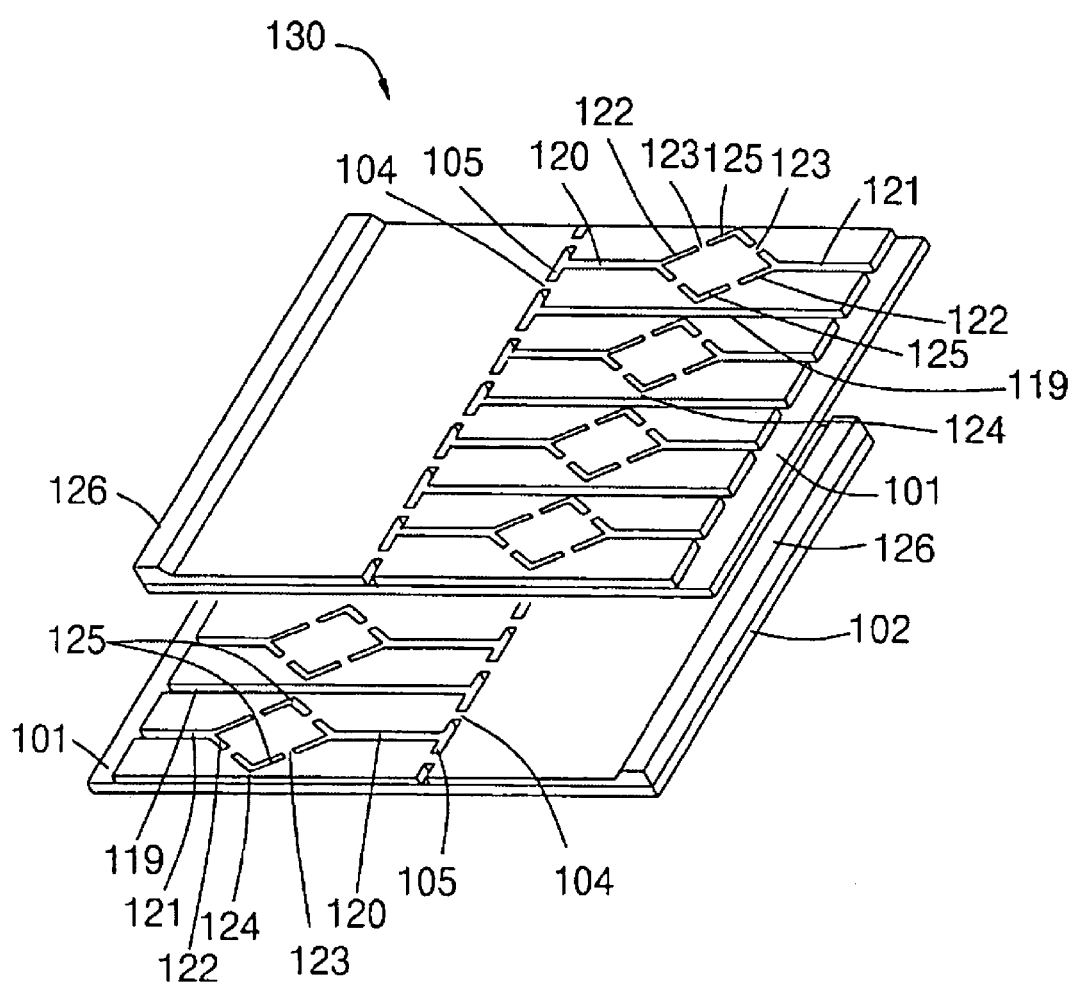
FIG. 10b is a view showing a developed state of a film capacitor applying the metallized plastic film according to the fifth embodiment of the present invention.

According to a fifth embodiment of the present invention as shown in FIG. 10a, the electrode metal is vapor-deposited on one or both sides of the dielectric plastic film 102, the first splitting part 105 is continuously formed by cutting the vapor-deposited metal 103 by predetermined width and length along the length of the plastic film 102 on any one position within a range of ½~⅘ of the width of the plastic film 102 from the margin part 101 formed at one side toward the other side opposite to the margin part 101 with respect to the width of the plastic film 102. Accordingly, the first fuse part 104 is generated between two adjoining first splitting parts 105.

Next, the ninth splitting part 119 is formed by cutting the vapor-deposited metal 103 by the pattern '−' from the first splitting part 105 to the end of the vapor-deposited metal 103 near the margin part 101, such that the split electrode 127 is formed on both sides of the ninth splitting part 119.

In addition, the tenth splitting part 120 is formed on one first splitting part 105 formed with the ninth splitting part 119 and another adjoining first splitting part 105 free of the ninth splitting part 119, by cutting the vapor-deposited metal 103 according to the pattern '−' by a predetermined length toward the margin part 101. The eleventh splitting part 121 is also formed by cutting the vapor-deposited metal 103 according to the pattern '−' from positions on the end of the vapor-deposited metal 103 near the margin part 101, the positions aligned with the tenth splitting part 120 in the width direction, toward the tenth splitting parts 120.

In addition, the twelfth splitting part 122 is formed by cutting the vapor-deposited metal 103 according to patterns '<' and '>' widening from one end of the tenth splitting part 120 and one end of the eleventh splitting part 121 each toward both sides by predetermined width and length.

Also, the thirteenth splitting part 125 is formed at a predetermined distance from both widened ends of the twelfth splitting part 122 according to patterns '☐' and '☐', thereby forming the seventh fuse part 123 at both widened ends of the twelfth splitting part 122 and the thirteenth splitting part 125.

Here, since the thirteenth splitting part 125 is spaced apart from adjoining ninth splitting parts 119, the eighth fuse part 124 is formed in the space between the thirteenth splitting part 125 and the ninth splitting part 119 as shown in FIG. 10a.

Thus, since the numbers of the first fuse part 104 and the second fuse part 111 are reduced to one and two, respectively, in the fifth embodiment as well, heat generation at the fuse parts is reduced. In addition, in the film capacitor formed by winding the two sheets of metallized plastic film 130 as one group, when the two sheets of the metallized plastic film 130 are overlapped in the opposite directions as shown in FIG. 9b, the first fuse parts 104 where the flow of electric current in the width direction and the heat generation is greatest are arranged in two rows, thereby distributing the generated heat to two parts. Accordingly, occurrence of high heat in the middle of the film capacitor can be restrained and the film capacitor can be maintained at a relatively low temperature uniformly.

Consequently, the film capacitor can be used even under a high temperature state and have an improved lifespan.

Meanwhile, 120 µF film capacitors are fabricated applying the conventional metallized plastic film 8 shown in FIG. 4a and applying the metallized plastic films 130 according to the first through the fifth embodiments of the present invention, using the plastic film 102 of a 60 mm width. Here, when a voltage of 450V and an electric current of 18 A are applied to the respective film capacitors, the temperature increased as tabulated in [Table 1] below.

TABLE 1

| Article | FIG. 4a | Embodiment 1 | Embodiment 2 | Embodiment 3 | Embodiment 4 | Embodiment 5 |
| --- | --- | --- | --- | --- | --- | --- |
| Increased temperature (° C.) | 9.3 | 6.2 | 6.0 | 6.1 | 6.2 | 6.1 |

As can be appreciated from [Table 1], the increased temperature degrees in the film capacitors applying the first to the fifth embodiments are in a range of 6.0~6.2° C., which is merely 64.5~66.6% of the increased temperature degree 9.3° C. of the conventional film capacitor.

As a consequence, the lifespan of the film capacitor can be elongated and furthermore, the property of the film capacitor is improved to be appropriate for use under a high temperature state.

When 100 µF film capacitors are fabricated applying the conventional metallized plastic film 8 shown in FIG. 4a and applying the metallized plastic films 130 according to the first through the fifth embodiments of the present invention, using the plastic film 102 of a 60 mm width. Also, a voltage of 450V and an electric current of 20 A are applied to the respective film capacitors for continuous 900 hours. Here, a reduction rate of capacitance of the film capacitors, and the degree of withstanding voltage inferiority with respect to the number of samples when the voltage is increased until the capacitance reduces by at least 95% are shown in [Table 2] as follows.

TABLE 2

| Article | FIG. 4a | Embodiment 1 | Embodiment 2 | Embodiment 3 | Embodiment 4 | Embodiment 5 |
| --- | --- | --- | --- | --- | --- | --- |
| Capacitance reduction rate (%) | 3.3 | 1.5 | 1.6 | 1.4 | 1.7 | 1.6 |
| Withstanding voltage inferiority/ sample number | 1/10 | 0/10 | 0/10 | 0/10 | 0/10 | 0/10 |

As can be appreciated from [Table 2], the reduction rates of capacitance of the embodiments are 1.4~1.7%. Considering 3.3% of the capacitance reduction rate of the conventional film capacitor of FIG. 4a, the embodiments of the present invention are superior to the conventional film capacitor. According to the experiment that gradually increases the applied voltage, the film capacitors according to the first to fifth embodiments proved very safe since inferiority of the withstanding voltage did not occur in any samples until the capacitance reduces by 95%.

More specifically, the metallized plastic films 130 of the first through fifth embodiments are configured by vapor-depositing the vapor-deposited metal 103 on one side of the dielectric plastic film 102, forming the sprayed metal contacting part 126 on the opposite end to the margin part 101, setting the resistance of the vapor-deposited metal 103 of the sprayed metal contacting part 126 to 0.5~10 $\Omega/cm^2$, and setting the other part of the vapor-deposited metal 103 to 2~20 $\Omega/cm^2$.

Although the respective fuse parts 104, 109, 111, 113, 115, 123 and 124 formed on each side of the split electrode 127 are illustrated in a single number in the drawings, the number of each fuse part can be increased or decreased as necessary, not being limited as illustrated in the drawings and explained in the description of the embodiments.

The metallized plastic film according to the embodiments of the present invention is designed in a manner that a vapor-deposited metal is deposited on one or both sides of a dielectric plastic film and the area of a split electrode is reduced. According to the embodiments, a split electrode elongated more in a width direction than a length direction of the plastic film is formed at any position within a range of ½~⅘ of the width of the plastic film from a margin part not vapor-deposited with the electrode metal. Therefore, the number of the fuse parts with respect to the width direction is reduced. For example, one first fuse part and one or two second through eighth fuse parts are provided so that the total number becomes 2 to 3, thereby reducing heat generated at the fuse parts.

Furthermore, in the film capacitor formed by winding the two sheets of metallized plastic film as one group, the first fuse parts where the flow of electric current in the width direction and the heat generation is greatest are arranged in two rows, thereby distributing the generated heat to two parts. Accordingly, occurrence of high heat in the middle of the film capacitor can be restrained and the film capacitor can be maintained at a relatively low temperature uniformly. Therefore, lifespan of the film capacitor is improved. Also, reliability of the film capacitor can be improved by decreasing the capacitance reduction rate, and the film capacitor can be used even under a high temperature state.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A metallized plastic film on which an electrode metal is vapor-deposited, comprising:
    a split electrode elongated in a width direction more than a length direction of a plastic film and disposed at any one position within a range of ½~⅘ of the width of the plastic film from a margin part formed at one side of the plastic film and not vapor-deposited with the electrode metal toward the other side of the plastic film with respect to the width direction;
    a fuse part formed on the non-split electrode or a part adjoining the split electrode near the non-split electrode;
    another fuse part formed on each side of respective two adjoining split electrodes,
    such that the split electrodes are patterned in a continuous form along the length of the plastic film and, in a film capacitor formed by winding two sheets of the metallized plastic film, the fuse parts formed between every pair of a split electrode and a non-split electrode, the fuse parts where a flow of electric current is the greatest in a width direction of the metallized plastic film, are arranged separately in two rows in a length direction of the plastic film; and
    a first splitting part formed by cutting an electrode metal by predetermined width and interval along a length of the plastic film;
    a second splitting part formed by cutting the electrode metal by predetermined width and length from the first splitting part toward the margin part formed at one side;
    a third splitting part formed by cutting the electrode metal by predetermined width from a position between one end of the second splitting part and one end of another adjoining second splitting part toward one end of the margin part; and
    a second fuse part formed between the second splitting part and the third splitting part by a fuse forming part generated by cutting the electrode metal in a direction from the one end of the second splitting part and one end of the third splitting part respectively toward adjoining third splitting parts and adjoining second splitting parts.

2. The metallized plastic film according to claim 1, further comprising:
    a fourth splitting part formed by cutting the electrode metal in accordance with a pattern '>' widening from the first splitting part to one side and a pattern '<' widening from the end of the margin part to the other side; and
    a fifth splitting part formed by cutting the electrode metal in a linear form extended crosswise toward both widened ends of the patterns '<' and '>', thereby having an X-shape pattern and forming a third fuse part at the both widened ends of the patterns '<' and '>'.

3. The metallized plastic film according to claim 2, further comprising a sixth splitting part formed by cutting the electrode metal according to a pattern '–' of a predetermined length from the middle position between the patterns '<' and '>' of the fourth splitting parts toward converged centers of the patterns '<' and '>', thereby becoming patterns in the form of '←' and '→' such that a fourth fuse part is formed in the middle between the fourth splitting part and one end of the electrode metal near the margin part.

4. The metallized plastic film according to claim 1, further comprising:
    a seventh splitting part formed by cutting the electrode metal according to a pattern '>' widening toward the margin part so that a fifth fuse part is formed in the middle position between the first splitting part and the end of the electrode metal near the margin part; and
    an eighth splitting part formed by cutting the electrode metal from positions on the end of the electrode metal near the margin part, the positions corresponding to both ends of the first splitting part, each toward both widened ends of the pattern '>' of the seventh splitting part, thereby forming a fifth fuse part of a predetermined width.

5. The metallized plastic film according to claim 1, further comprising:
    a ninth splitting part formed by cutting the electrode metal according to a pattern '–' from the first splitting part toward the electrode metal near the margin part;
    a tenth splitting part formed by cutting the electrode metal according to the pattern '–' by a predetermined length from a position between the first splitting part formed with the ninth splitting part and another adjoining first splitting part toward the margin part;
    an eleventh splitting part formed by cutting the electrode metal according to the pattern '–' from the end of the electrode metal near the margin part toward the tenth splitting part;
    a twelfth splitting part formed on the electrode metal to widen from one end of the tenth splitting part and one end of the eleventh splitting part each toward both sides by predetermined width and length; and
    a thirteenth splitting part formed at a predetermined distance from both widened ends of the twelfth splitting part according to patterns 'Λ' and 'V' so that a seventh fuse part is formed, and spaced apart from adjoining ninth splitting parts by a predetermined distance so that an eighth fuse part is formed.

6. The metallized plastic film according to claim 1, wherein the fuse parts have an approximately 0.1~0.2 mm width.

7. The metallized plastic film according to claim 1, wherein the vapor-deposited metal deposited on the plastic film has a resistance of about 0.5~10 $\Omega/cm^2$ at a sprayed metal contacting part formed at the other end opposite to the margin part with respect to the width direction, and has a resistance of about 2~20 $\Omega/cm^2$ at the other part excluding the sprayed metal contacting part.

8. The metallized plastic film according to claim 1, wherein vapor-deposition of the electrode metal on the plastic film is performed by vapor-depositing any one of aluminum and an aluminum alloy, by vapor-depositing any one of aluminum and an aluminum alloy primarily and then vapor-depositing any one of zinc and a zinc alloy secondarily, or by vapor-depositing any one of aluminum and an aluminum alloy primarily and then vapor-depositing any of zinc and a zinc alloy secondarily only on the sprayed metal contacting part.

9. A film capacitor according to claim 1, wherein the fuse part of any one of the split electrodes is distanced by 1~40 mm from the fuse part of another adjoining split electrode with respect to the width direction.

10. A film capacitor applying the metallized plastic film fabricated in accordance with claim 1.

* * * * *